(12) United States Patent
Dörenberg

(10) Patent No.: US 11,084,663 B2
(45) Date of Patent: Aug. 10, 2021

(54) DEVICE AND METHOD FOR THE FLEXIBLE DISTRIBUTION OF PACKAGES

(71) Applicant: SIG Technology AG, Neuhausen am Rheinfall (CH)

(72) Inventor: Udo Dörenberg, Kerpen (DE)

(73) Assignee: SIG Technology AG, Neuhausen am Rheinfall (CH)

( * ) Notice: Subject to any disclaimer, the term of this patent is extended or adjusted under 35 U.S.C. 154(b) by 0 days.

(21) Appl. No.: 16/484,944

(22) PCT Filed: Jan. 24, 2018

(86) PCT No.: PCT/EP2018/051697
§ 371 (c)(1),
(2) Date: Aug. 9, 2019

(87) PCT Pub. No.: WO2018/149603
PCT Pub. Date: Aug. 23, 2018

(65) Prior Publication Data
US 2020/0002099 A1    Jan. 2, 2020

(30) Foreign Application Priority Data
Feb. 14, 2017   (DE) .................... 10 2017 102 913.3

(51) Int. Cl.
*B65G 47/08*  (2006.01)
*B65G 54/02*  (2006.01)
(Continued)

(52) U.S. Cl.
CPC .......... *B65G 47/086* (2013.01); *B65G 23/23* (2013.01); *B65G 47/28* (2013.01); *B65G 47/682* (2013.01); *B65G 54/02* (2013.01)

(58) Field of Classification Search
CPC ...... B65G 19/02; B65G 19/225; B65G 19/26; B65G 47/28; B65G 47/682; B65G 47/086; B65G 54/02; B65G 23/23
(Continued)

(56) References Cited

U.S. PATENT DOCUMENTS 3,627,103 A * 12/1971 Leach .................. B65G 47/086
                                                      198/374
4,411,353 A * 10/1983 McDole ................ C03B 35/085
                                                      198/419.3
(Continued)

FOREIGN PATENT DOCUMENTS

CN         1054042 A      8/1991
CN         1239062 A     12/1999
(Continued)

*Primary Examiner* — Mark A Deuble
(74) *Attorney, Agent, or Firm* — The Webb Law Firm

(57) ABSTRACT

The invention relates to a device for the flexible distribution of packages, comprising at least one conveyor belt for transporting the packages along a transport direction, and at least one distributing device for moving the packages relative to the conveyor belt, wherein the distributing device has a plurality of sliding elements which are mounted movably on the distributing device, and wherein the sliding elements can be driven independently of each other. In order to achieve a reliable movement of individual packages of different sizes at individual speeds, it is proposed that the sliding elements respectively have two contact surfaces which are arranged at an angle to each other.

13 Claims, 3 Drawing Sheets

(51) Int. Cl.
 *B65G 23/23* (2006.01)
 *B65G 47/28* (2006.01)
 *B65G 47/68* (2006.01)

(58) Field of Classification Search
 USPC .............................. 198/619, 370.07, 370.08
 See application file for complete search history.

(56) References Cited

U.S. PATENT DOCUMENTS

| | | | |
|---|---|---|---|
| 5,121,585 A | 6/1992 | Focke et al. | |
| 5,129,209 A | 7/1992 | Focke | |
| 5,253,904 A | 10/1993 | Ruby | |
| 5,871,079 A * | 2/1999 | Nannini | B65G 47/086 |
| | | | 198/377.04 |
| 7,621,715 B2 | 11/2009 | Borderi et al. | |
| 8,833,545 B2 * | 9/2014 | Perl | B65G 47/086 |
| | | | 198/347.1 |
| 9,079,724 B2 * | 7/2015 | van de Loecht | B65G 47/841 |
| 9,409,724 B2 | 8/2016 | Hammacher | |
| 10,287,105 B2 * | 5/2019 | Hayashi | B65G 54/02 |
| 2006/0201780 A1 * | 9/2006 | Feigel | B65G 47/766 |
| | | | 198/370.08 |
| 2008/0023305 A1 | 1/2008 | Wild et al. | |
| 2008/0271975 A1 * | 11/2008 | Radwallner | B65G 47/82 |
| | | | 198/370.07 |
| 2008/0289930 A1 | 11/2008 | Fischer | |
| 2010/0084247 A1 * | 4/2010 | Wipf | B65G 47/28 |
| | | | 198/617 |
| 2014/0083817 A1 | 3/2014 | van de Loecht et al. | |
| 2015/0078876 A1 * | 3/2015 | Michler | B65H 31/3081 |
| | | | 414/789.1 |
| 2015/0321857 A1 | 11/2015 | Sacchetti et al. | |
| 2016/0137424 A1 | 5/2016 | Cavazza et al. | |
| 2016/0159583 A1 | 6/2016 | Keil et al. | |
| 2016/0244271 A1 * | 8/2016 | Walter | B65G 47/715 |
| 2016/0362208 A1 | 12/2016 | Papsdort et al. | |

FOREIGN PATENT DOCUMENTS

| | | |
|---|---|---|
| CN | 1899143 A | 1/2007 |
| CN | 104220349 A | 12/2014 |
| CN | 105339286 A | 2/2016 |
| DE | 29512736 U1 | 10/1995 |
| DE | 202005015268 U1 | 3/2007 |
| DE | 102007022910 A1 | 11/2008 |
| DE | 102011075178 A1 | 11/2012 |
| DE | 102013204095 A1 | 9/2014 |
| DE | 102013107565 A1 | 1/2015 |
| EP | 1882651 A1 | 1/2008 |
| EP | 2743192 A1 | 6/2014 |
| EP | 2960217 A1 | 12/2015 |
| EP | 3059190 A1 | 8/2016 |
| WO | 2015014559 A1 | 2/2015 |
| WO | 2016200753 A1 | 12/2016 |

* cited by examiner

DEVICE AND METHOD FOR THE FLEXIBLE DISTRIBUTION OF PACKAGES

CROSS-REFERENCE TO RELATED APPLICATIONS

This application is the United States national phase of International Application No. PCT/EP2018/051697 filed Jan. 24, 2018, and claims priority to German Patent Application No. 10 2017 102 913.3 filed Feb. 14, 2017, the disclosures of which are hereby incorporated by reference in their entirety.

BACKGROUND OF THE INVENTION

Field of the Invention

The invention relates to a device for the flexible distribution of packages, comprising at least one conveyor belt for transporting the packages along a transport direction, and at least one distributing device for moving the packages relative to the conveyor belt, wherein the distributing device comprises a plurality of sliding elements, which are mounted movably on the distributing device, and wherein the sliding elements can be driven independently of each other.

The invention also relates to a method for the flexible distribution of packages, comprising the following steps: a) providing a device for the flexible distribution of packages and providing a plurality of packages, b) moving the packages on a conveyor belt along a transport direction, c) moving the packages along a distribution direction using a sliding element of a distributing device.

Description of Related Art

Packages can be made in different ways and from a variety of materials. A widely used option for production comprises producing a blank from the packaging material, usually having fold lines, from which by folding and further steps a package is produced. The packages are then filled and sealed. Composites are often used as materials, for example, a composite of several thin layers of paper, cardboard, plastic or metal. Such packages are widely used, especially in the foodstuffs industry.

In many cases, packages must be subjected to further processing steps after production, filling, and sealing. For example, it may be necessary to combine several packages into a bundle and to enclose them with a plastic film or other outer packaging. In addition, it may be necessary to arrange several packages on a pallet for further transport ("palletising"). For these steps it may be necessary to group packages together. This requires devices that can distribute and group the individual packages in the desired manner.

Devices are known from the prior art, in which the distribution of the packages takes place via conveyor belts and distributing devices. The distributing devices may, for example, be circulating belts or chains on which sliders are arranged at fixed intervals, which grip and move the packages standing on the conveyor belt. This makes it possible that the packages not only follow the transport direction of the conveyor belt but can be moved relative to the conveyor belt. Such solutions are characterised by a simple and robust construction but do entail some disadvantages. One disadvantage is, for example, that such distributing devices do not allow individual adjustment of the speeds of the packages, due to the constant rotational speed of the belts or chains and the predetermined distances of the sliders. Instead, all packages are moved at an identical speed at fixed intervals from each other.

In order to avoid some of the disadvantages mentioned, transport devices have already been proposed in which the transport speeds of the packages can be adjusted independently of each other. This is achieved by the fact that the sliders are not arranged at fixed intervals on a circulating chain but have alternative drives. These drives may be, for example, electromagnetic linear drives or linear motors. Each slider can be controlled individually by such drives, so that different speeds of the slider are possible, at least for a short period of time. Different speeds allow packages of different packaging to be moved at different speeds at the same time, allowing flexible distribution of the packages. Such devices and methods for transporting packages are known from DE 10 2013 107 565 A1 and from WO 2015/014559 A1.

Although the devices and methods shown in these cases allow a more individual adjustment of the speed, they do however still entail some disadvantages. One disadvantage is that the packages to be transported could rock and even fall over due to the accelerations made possible (increase or decrease in speed). In WO 2015/014559 A1, this disadvantage is compensated by the fact that individual packages are not moved, but only bundles of several packages, which are less likely to tip. In DE 10 2013 107 565 A1, however, sliders or carriers are used, whose shape is adapted to the shape of the packages to be transported. Specifically, container support elements with curved support surfaces are used, which correspond to the circumferential or lateral surface of the bottles to be transported. This has the disadvantage that when changing the packaging ("format change") the sliders or carriers must also be adjusted or replaced, if this is structurally possible.

The invention therefore addresses the problem of further developing and designing the device described and explained in more detail above, so that individual packages of different sizes can be reliably moved at individual speeds.

SUMMARY OF THE INVENTION

A device according to the invention serves for the flexible distribution of packages, in particular the flexible movement and arrangement of packages. The device initially comprises at least one conveyor belt for transporting the packages along a transport direction. The conveyor belt may be any suitable feed device, but preferably a feed device having a flat surface such as a conveyor belt. The device also comprises at least one distributing device for moving the packages relative to the conveyor belt. The distributing device can serve, in particular, to laterally displace the packages standing on the conveyor belt and in this way to generate a relative movement between the packages and the conveyor belt. The distributing device has a plurality of sliding elements, which are mounted movably on the distributing device. For example, the sliding elements can be displaced along a guide or track provided on the distributing device. The sliding elements can be driven independently. For example, the sliding elements may have different speeds. In addition, the speed of a sliding element can vary along its route. This can result in the distance between adjacent sliding elements changing during operation. In other words, the sliding elements should not necessarily move in a fixed cycle or rhythm but can be moved variably.

According to the invention it is provided that the sliding elements respectively have two contact surfaces which are arranged at an angle to each other. An "angular" arrangement is understood in particular to mean an arrangement in which the two contact surfaces enclose an angle of less than 180° with respect to one another, that is to say, they do not lie in the same plane. Preferably, the contact surfaces are respectively partially or completely flat. In addition, the contact surfaces preferably run in the vertical direction relative to the conveyor belt. The contact surfaces serve to contact and move the packages. In particular, the contact surfaces should contact side surfaces of the packages and move the packages standing on the conveyor belt in a lateral direction. By providing two angled contact surfaces, the package can be contacted and moved at two different locations, preferably on two adjacent side surfaces. This allows a more precise displacement of the packages compared to a single contact surface, since the packages can occupy a secure and defined position in the angle enclosed by the two contact surfaces. In addition, an angular arrangement of the contact surfaces allows the displacement of packages of different dimensions and formats, since the contact surfaces "open" with increasing distance from their intersection or vertex, like the legs of an angle. Smaller packages therefore "dive" deeper or more completely between the contact surfaces, while larger packages dive less deeply or incompletely between the contact surfaces.

According to one embodiment of the device, it is provided that the sliding elements are designed approximately L-shaped. In particular, it can be provided that the two contact surfaces of the sliding elements form approximately an "L" shape. An L-shaped design is characterised by an angle in the range of approx. 90° between the two contact surfaces, for example by an angle in the range between 80° and 100°. This has the advantage that packages with edges that have similar angles can be moved particularly readily, for example cuboid packages.

In a further embodiment of the device it is provided that the contact surfaces of the sliding elements are unbounded on one side. This means that the contact surfaces have no boundary at one end, preferably at their end remote from the vertex or intersection. For example, the contact surfaces may be flat at their outer ends. In particular, the contact surfaces should not be inclined or curved inwards at their outer ends, i.e. toward the side intended for the packages. This however has the disadvantage that the packages may not be "enclosed" and clamped by the contact surfaces of several sides. A significant advantage of the unilaterally open design of the contact surfaces is that packages with different sizes and formats can be moved using the same sliding elements. Different packaging sizes can therefore be processed on one device, without the necessity that the sliding elements be replaced in case of a change of format.

According to a further embodiment of the device, it is provided that the contact surfaces have a width in the range between 20 mm and 60 mm, in particular between 30 mm and 50 mm. Contact surfaces of a size in the specified range can safely move most commonly used packaging sizes. The width is understood to mean the extent in the horizontal direction, i.e. parallel to the surface of the conveyor belt and parallel to the bottom of the packages.

A further embodiment of the invention provides that the sliding elements are mounted pivotably relative to the distributing device. Due to the pivotable mounting, the sliding elements can for example be folded in and folded out again. This has the advantage of avoiding accidental collisions with other packages. This is particularly important in sliding elements which are guided along a circulating track, wherein the sliding elements, for example, can be folded out on the "way forward" and can be folded in on the "way back".

According to a further embodiment of the device, it is provided that the distributing device has a circulating track for guiding the sliding elements. By the use of a circulating track, the sliding elements can be returned particularly conveniently after they have moved a package. In contrast to an intermittent movement along a track with two ends, higher speeds are possible without jerky accelerations. In addition, collisions of sliding elements can be avoided. The circulating track may be straight in sections, for example comprising two straight sections (e.g., one forwards run and one backwards run) and two curved sections.

In a further embodiment of the device it is provided that the track runs at least in sections above the conveyor belt. Alternatively or additionally, it can be provided that the track runs at least in sections below the conveyor belt. A course above the conveyor belt ensures that the packages standing on the conveyor belt are easily accessible and can be moved easily by the sliding elements. It is preferable, therefore, that the region of the track of the distributing device, in which the packages are to be displaced (e.g. the forwards run), runs above the conveyor belt. With a course below the conveyor belt, however, it is achieved that unintentional collisions between the sliding elements and the packages can be avoided in a space-saving manner. It is preferable, therefore, that the region of the track of the distributing device, in which the packages are not to be displaced and in which the sliding elements are rather on the way back (e.g. the backwards run), runs below the conveyor belt.

A further embodiment of the device is characterised by an electromagnetic drive, in particular an electromagnetic linear drive for driving the sliding elements. All drive systems which lead to a translational movement are referred to as 'linear drive' or 'linear drive system'. An electromagnetic linear drive is also referred to as a direct drive. A linear motor is an electric drive motor. Unlike the widely used rotating machines, a linear motor does not displace the objects it drives into a rotating movement but moves them along a straight or curved track (translational movement). Linear drives allow individual control of the sliding elements, for example, a control involving different speeds.

The above-described problem is also solved by a method for the flexible distribution of packages, comprising the following steps: a) providing a device for the flexible distribution of packages and providing several packages, b) moving the packages on a conveyor belt along a transport direction, c) moving the packages along a distribution direction using a sliding element of a distributing device. The method is characterised in that the packages are contacted on respectively two adjacent side surfaces by two contact surfaces of a sliding element arranged at an angle to one another. The device provided in step a) can be, for example, a device according to any one of claims 1 to 9, that is to say the device described above in one of its embodiments.

As has already been explained in connection with the device, the advantage of two contact surfaces arranged at an angle to one another is that packages of different sizes and formats can be safely displaced. An "angular" arrangement is understood in particular to mean an arrangement in which the two contact surfaces enclose an angle of less than 180° with respect to one another, that is to say they do not lie in the same plane. Preferably, the contact surfaces are respectively partially or completely flat. In addition, the contact surfaces preferably run in the vertical direction relative to the conveyor belt. The contact surfaces serve to contact and move the packages. In particular, the contact surfaces should contact side surfaces of the packages and move the packages standing on the conveyor belt in a lateral direction. By providing two angled contact surfaces, the package can be contacted and moved at two different locations, preferably on two adjacent side surfaces. This allows a more precise displacement of the packages compared to a single contact surface, since the packages can occupy a secure and defined position in the angle enclosed by the two contact surfaces. In addition, an angular arrangement of the contact surfaces allows the displacement of packages of different dimensions and formats, since the contact surfaces "open" with increasing distance from their intersection or vertex, like the legs of an angle. Smaller packages therefore "dive" deeper or more completely between the contact surfaces, while larger packages dive less deeply or incompletely between the contact surfaces.

According to one embodiment of the method it is provided that the packages are made of a composite material. The method described above is particularly suitable for the displacement of composite packaging, since composite packaging has a lower rigidity and dimensional stability, despite its many advantages compared to metal cans or glass bottles and should therefore be moved with the lowest possible pressure. This is achieved more effectively with flat elements such as the angled contact surfaces than by selectively acting grippers, pincers or the like.

In a further embodiment of the method it is provided that the packages are approximately cuboid. Cuboid packages have flat, planar sides and are therefore particularly suitable for being displaced by planar elements such as the angled contact surfaces of the sliding elements. In addition, cuboid packages do not necessarily have a square cross-sectional area, but often have a rectangular cross-sectional area, so that displacement by angled contact surfaces is more advantageous than by grippers which would have to be shaped differently for the narrow side of the packaging than for the wide side of the packaging.

According to a further embodiment of the method, it is provided that the packages have different dimensions. In other words, packages with different sizes and formats can be moved by the same method and possibly on the same system, for example, in several batches in succession. The method is particularly suitable for this purpose, since the sliding elements used have two contact surfaces arranged at an angle to one another and therefore, as already described above, can move packages of different dimensions without changing or remodelling the sliding elements.

According to a further embodiment of the invention, it is provided that the sliding elements are driven independently of each other. It can be provided that different sliding elements are moved at different speeds. It can also be provided that each sliding element is moved at varying speeds. For example, a gentle acceleration of the packages can be achieved and unintentional tipping over of the packages can be prevented. In addition, the "free" sliding elements can be returned at an increased speed before they move the next package.

A further embodiment of the method finally provides that the sliding elements are driven by an electromagnetic drive, in particular an electromagnetic linear drive. The characteristics and advantages of such drives have previously been described in connection with the device. In particular, they allow a variable and independent control of the sliding elements.

BRIEF DESCRIPTION OF THE DRAWINGS

The invention will be explained in more detail with reference to a drawing showing only a preferred embodiment. In the drawings.

DESCRIPTION OF THE INVENTION

Figure 1:
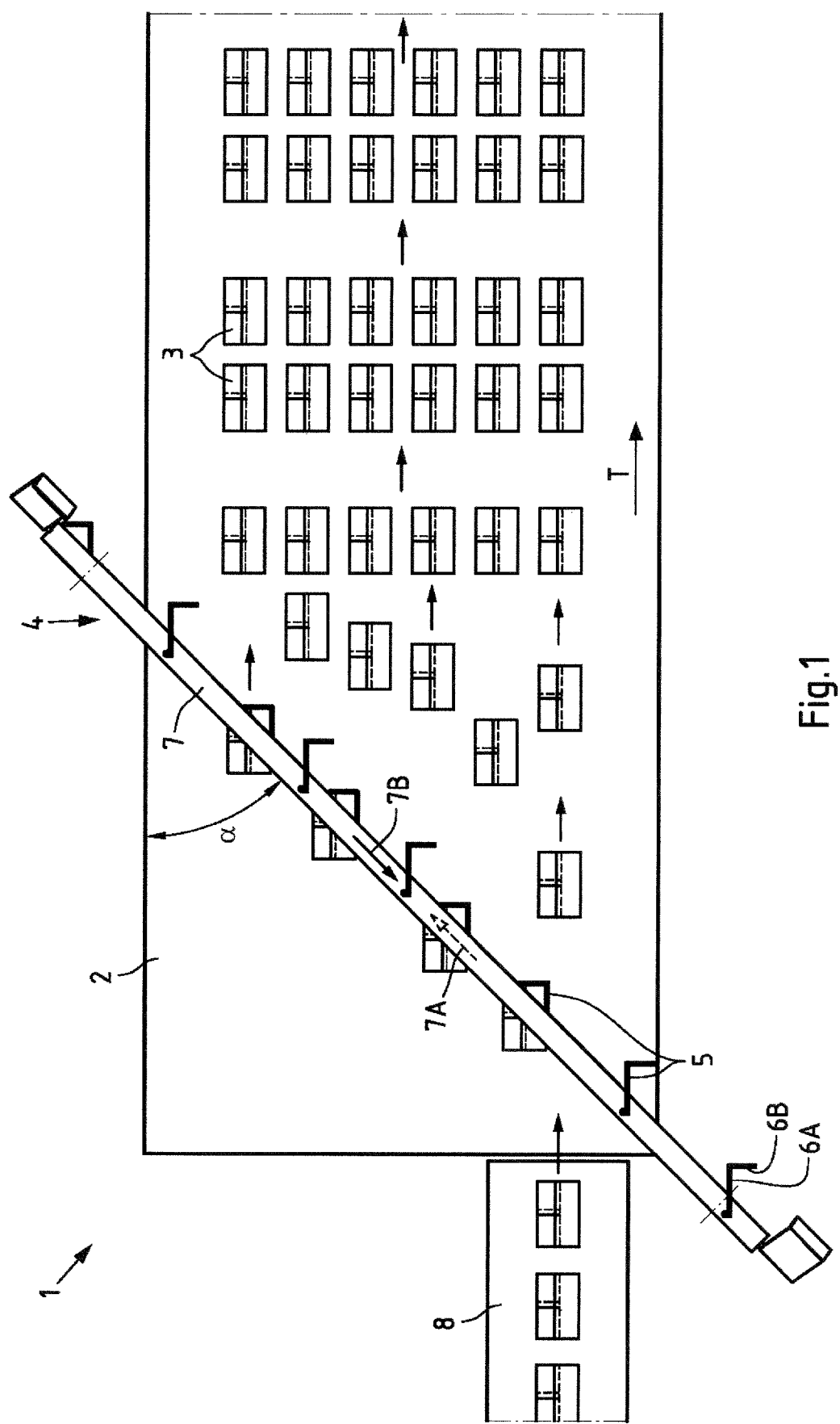
FIG. 1 shows a first embodiment of a device according to the invention in a plan view.

FIG. 1 shows a first embodiment of a device 1 according to the invention in a plan view. The device 1 comprises a conveyor belt 2 for transporting packages 3 along a transport direction T. The device 1 also comprises a distributing device 4 for moving the packages 3 relative to the conveyor belt 2. The distributing device 4 has a plurality of sliding elements 5, which are mounted movably on the distributing device 4. In the device 1 shown in FIG. 1 and thus preferred, the sliding elements 5 are driven by an electromagnetic linear drive and can be moved independently of each other. The sliding elements respectively have exactly two contact surfaces 6A, 6B, which are arranged at an angle to each other. The design and function of the two contact surfaces 6A, 6B will be discussed in more detail in connection with FIG. 3. The sliding elements 5 are mounted pivotably relative to the distributing device 4 and can be folded over in order to avoid unintentional collisions with packages 3.

In the device 1 shown in FIG. 1, the distributing device 4 has a circulating track 7 for guiding the sliding elements 5. Due to the circulating design of the track 7, a continuous and closed circulation system for the sliding elements 5 is achieved. The track 7 preferably runs straight in sections. It may, for example, have a forwards run 7A and a backwards run 7B (movement direction in FIG. 1 respectively marked with arrows. The track 7 preferably runs at least in sections above the conveyor belt 2. In particular, the forwards run 7A of the track 7 can run above the conveyor belt 2. In the device 1 shown in FIG. 1, the track 7 even runs completely above the conveyor belt 2, wherein the backwards run 7B is arranged above the forwards run 7A. Alternatively (and in contrast to that shown in FIG. 1), it can be provided that the track 7 runs at least in sections below the conveyor belt 2. In particular, the backwards run 7B of the track 7 can run below the conveyor belt 2. The device 1 shown in FIG. 1 has a feed 8, which is designed to have a single track. Only on the conveyor belt 2 are the packages 3 arranged by the distributing device 4 in a multi-track configuration (six tracks) next to each other. The track 7 of the distributing device 4 runs obliquely to the transport direction T and encloses an angle α with the conveyor belt 2 which is preferably in the range between 40° and 50°.

Figure 2:
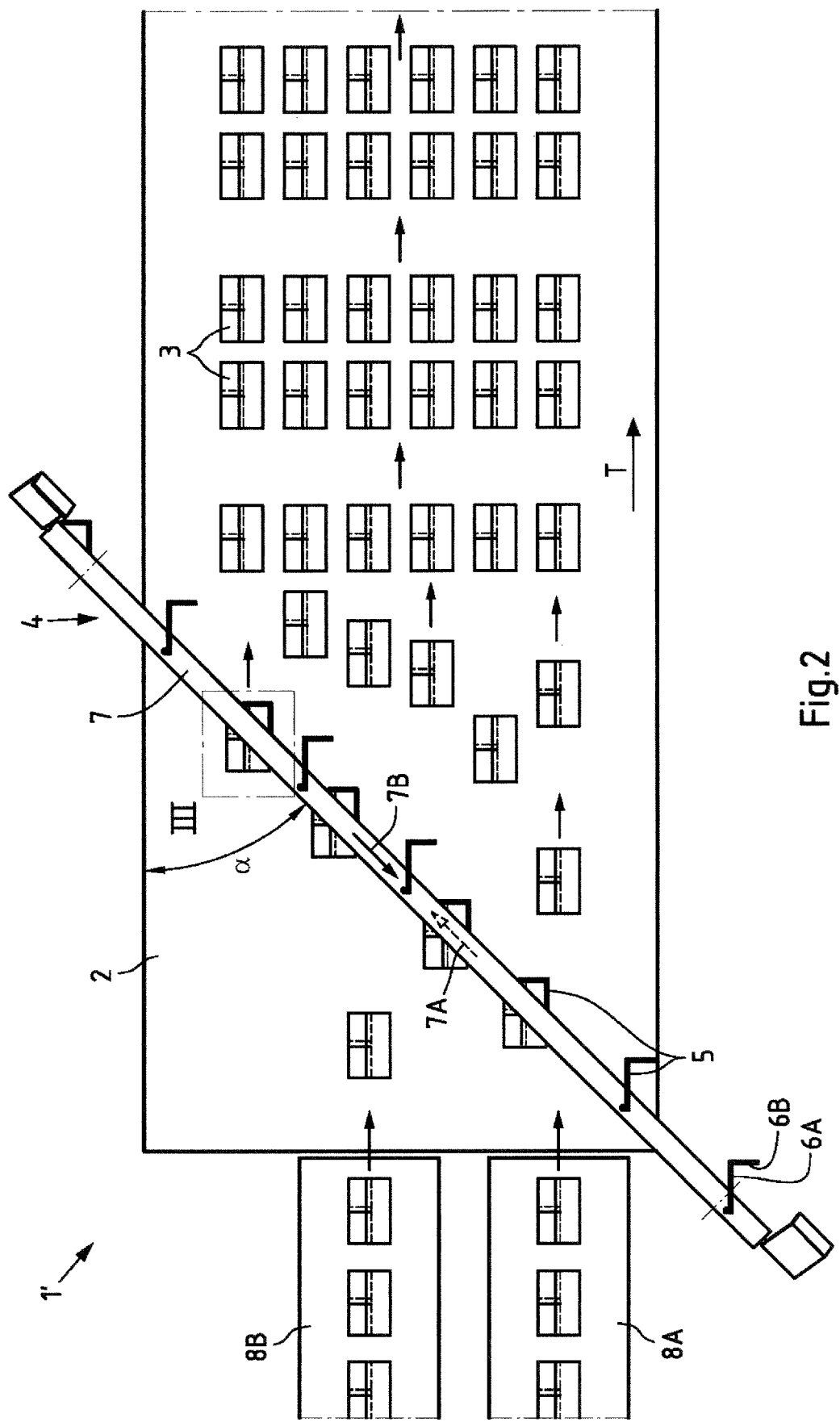
FIG. 2 shows a second embodiment of a device according to the invention in a plan view.

FIG. 2 shows a plan view of a second embodiment of a device 1' according to the invention. Those areas of the device 1' which have already been described in connection with the device 1 from FIG. 1, are provided with corresponding reference signs in FIG. 2. The second embodiment of the device 1' (FIG. 2) differs in particular from the first embodiment of the device 1 (FIG. 1) in that the device 1' has two feeds 8A, 8B. It is therefore a two-track feed. On the conveyor belt 2, the packages 3 are arranged in multiple tracks (six tracks) next to one another by the distributing device 4.

Figure 3:
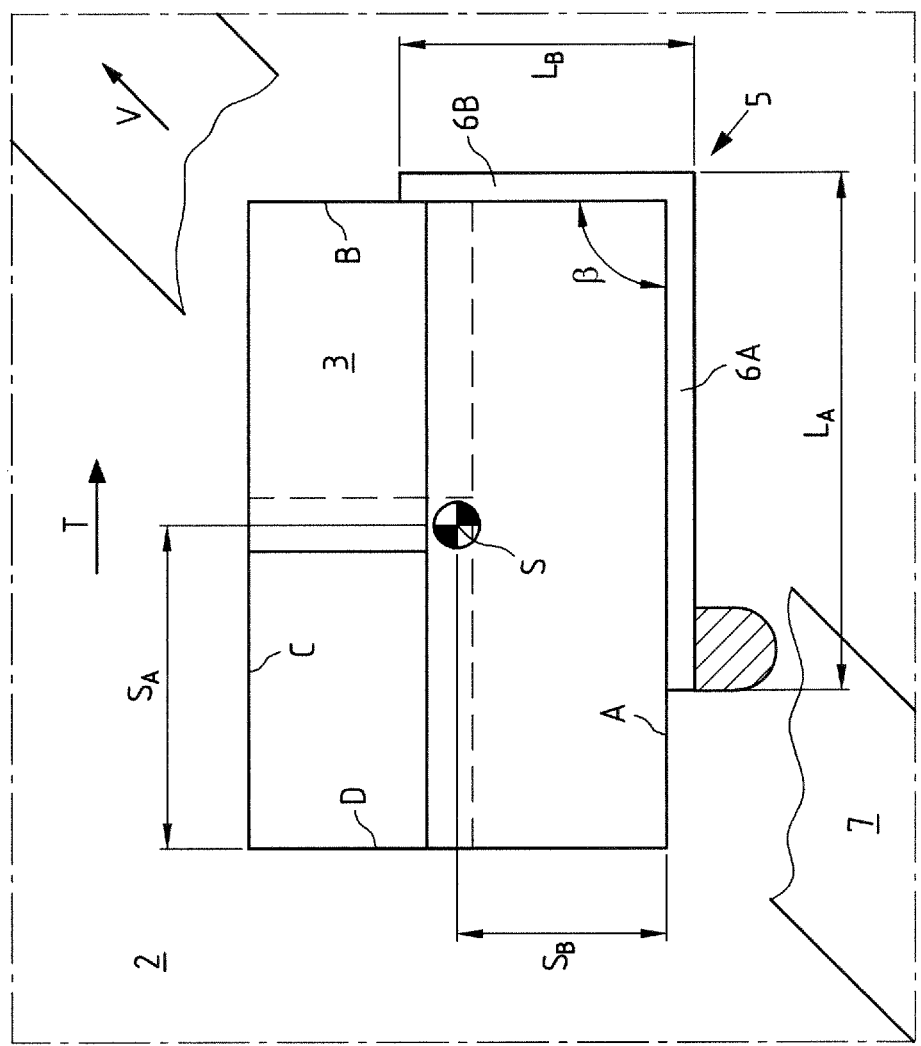
FIG. 3 shows the region of the device labelled III in FIG. 2 in an enlarged view.

FIG. 3 finally shows the region of the device, labelled with III in FIG. 2, in an enlarged view. Those regions of the device 1' which have already been described in connection with the device 1 from FIG. 1 and the device 1' from FIG. 2 are provided with corresponding reference signs in FIG. 3. The area represented in an enlarged view shows, in particular, a package 3 and a sliding element 5, which shifts the package 3 in a distribution direction V. The resulting movement direction of the package 3 therefore results from the superimposition of the transport direction T to the package 3 and the distribution direction V to the distributing device 4.

The package 3 shown in FIG. 3 is an approximately cuboid composite packaging for foodstuffs. The composite material of the package may comprise a plurality of thin layers of paper, cardboard, plastic or metal. The package 3 illustrated in FIG. 3 and thus preferred has four side surfaces, of which two wide side surfaces A, C are arranged opposite and parallel to each other and of which two narrow side surfaces B, D are also arranged opposite and parallel to each other. The package 3 has a centre of gravity S, which has a distance $S_A$ to the two narrow side surfaces B, D and which has a distance $S_B$ to the two wide side surfaces A, C.

The sliding element 5 shown in FIG. 3 has two contact surfaces 6A, 6B, which are arranged at an angle to each other and enclose an angle β. The angle β is preferably in the range between 80° and 100°, in particular is approx. 90°. The sliding element 5 is therefore designed approximately L-shaped, wherein the two contact surfaces 6A, 6B form the two legs of the "L". The package 3 shown in FIG. 3 is a package with a volume of approx. 1000 ml, in which the two wide side surfaces A, C have a width of approx. 95 mm and in which the two narrow side surfaces B, D have a width of approx. 63 mm. With a central arrangement of the centre of gravity S, therefore, the distance $S_A$ between the centre of gravity S and the side surfaces B, D is approx. 47.5 mm and the distance $S_B$ between the centre of gravity S and the side surfaces A, C is approx. 31.5 mm. The two contact surfaces 6A, 6B of the sliding element 5 have larger widths, so that they extend from their common corner to beyond the centre of gravity S. In the sliding element 5 shown in FIG. 3, the wider contact surface 6A has a width $L_A$ of approx. 60 mm and the narrower contact surface 6B has a width $L_B$ of approx. 40 mm. As a result of this design of the sliding element 5 and its contact surfaces 6A, 6B, it is achieved that the package 3 is securely held in the sliding element 5. The values for $S_A$, $S_B$, $L_A$, $L_B$ are measured in a horizontal direction, i.e. parallel to the surface of the conveyor belt 2 and parallel to the bottom of the package 3.

LIST OF REFERENCE NUMERALS 1, 1': Device
2: Conveyor belt
3: Package
4: Distributing device
5: Sliding element
6A, 6B: Contact surface
7: Track
7A: Forwards run (of the track 7)
7B: Backwards run (of the track 7)
8, 8A, 8B: Feed
α: Angle (between transport direction T and distributing device 4)
β: Angle (between the contact surfaces 6A, 6B)
A, B, C, D: Side surface (of the package 3)
$L_A$, $L_B$: Width (of the contact surfaces 6A, 6B)
S: Centre of gravity (of the package 3)
$S_A$, $S_B$: Distance (between centre of gravity S and side surface A, B, C, D)
T: Transport direction
V: Distribution direction

The invention claimed is:

1. A device for the flexible distribution of packages, comprising:
   at least one conveyor belt for transporting the packages along a transport direction, and
   at least one distributing device that runs obliquely to the transport direction for laterally displacing the packages relative to the conveyor belt,
   wherein the distributing device has a plurality of sliding elements which are mounted movably on the distributing device,
   wherein the sliding elements can be driven independently, and
   wherein the sliding elements respectively have two contact surfaces, which are arranged at an angle to each other and serve to contact and move the packages,
   characterised in that the sliding elements are pivotably mounted relative to the distributing device, and the contact surfaces of the sliding elements are each unbounded on one side.

2. The device according to claim 1, characterised in that the sliding elements are designed approximately L-shaped.

3. The device according to claim 1, characterised in that the contact surfaces have a width in the range between 20 mm and 60 mm.

4. The device according to claim 1, characterised in that the distributing device has a circulating track for guiding the sliding elements.

5. The device according to claim 4, characterised in that the track runs above the conveyor belt at least in sections.

6. A method for the flexible distribution of packages, comprising the following steps:
   a) providing a device for the flexible distribution of packages and providing a plurality of packages,
   b) moving the packages on a conveyor belt along a transport direction,
   c) moving the packages along a distribution direction by means of a sliding element of a distributing device,
   wherein the packages are contacted on two respectively adjacent side surfaces by two contact surfaces of a sliding element arranged at an angle to each other,
   characterised in that the sliding elements are pivotably mounted relative to the distributing device, the contact surfaces of the sliding elements are each unbounded on one side, and the distribution direction is oblique to the transport direction.

7. The method according to claim 6, characterised in that the packages are made of a composite material.

8. The method according to claim 6, characterised in that the packages are approximately cuboid.

9. The method according to claim 6, characterised in that the packages have different dimensions.

10. The method according to claim 6, characterised in that the sliding elements are driven independently of each other.

11. The method according to claim 6, characterised in that the sliding elements are driven by an electromagnetic drive.

12. The device according to claim 3, characterised in that the contact surfaces have a width in the range between 30 mm and 50 mm.

13. The method according to claim 11, characterised in that the sliding elements are driven by an electromagnetic linear drive.

\* \* \* \* \*